Aug. 18, 1959 W. F. MELLEN 2,900,032
AUTOMATIC SELF-ALIGNING TWO-WAY PLOW
Filed July 30, 1956 2 Sheets-Sheet 1
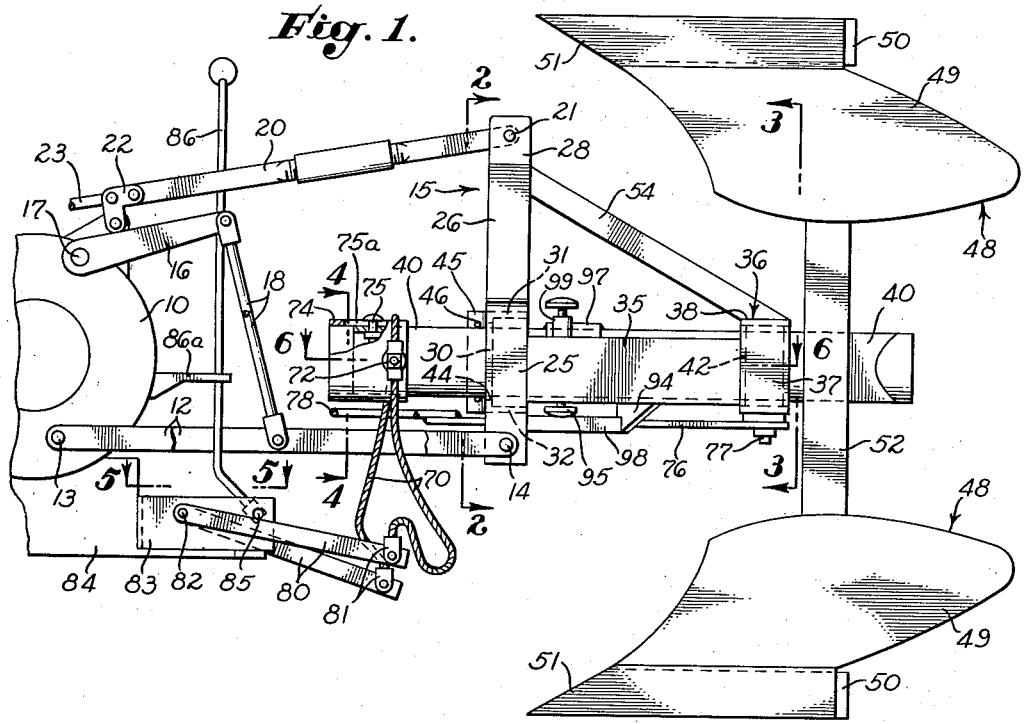
INVENTOR.
WILLIAM FISK MELLEN
BY HIS ATTORNEYS.
HARRIS, KIECH, FOSTER & HARRIS

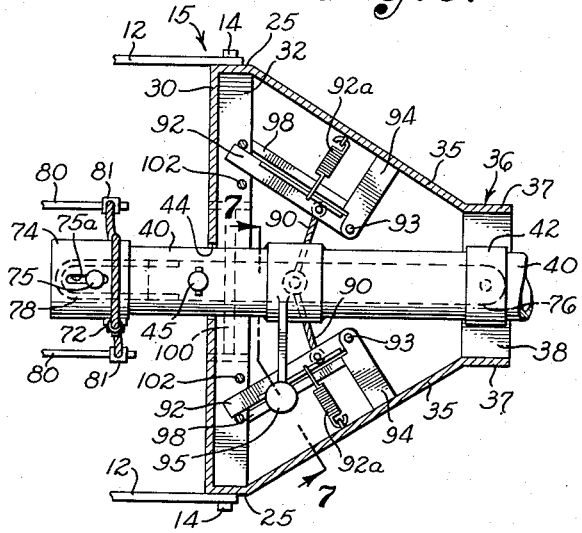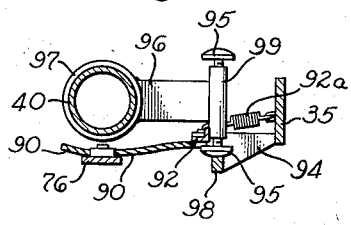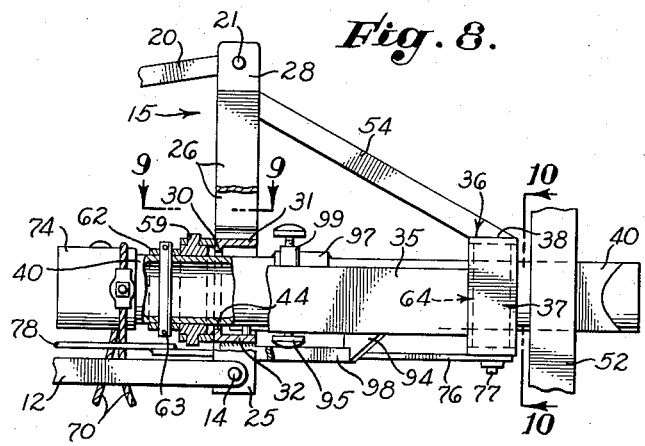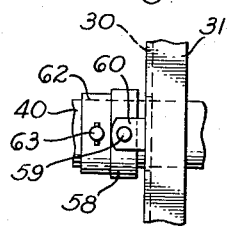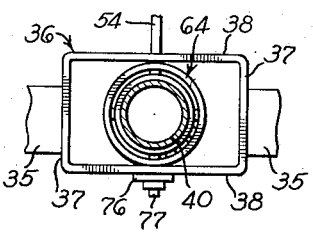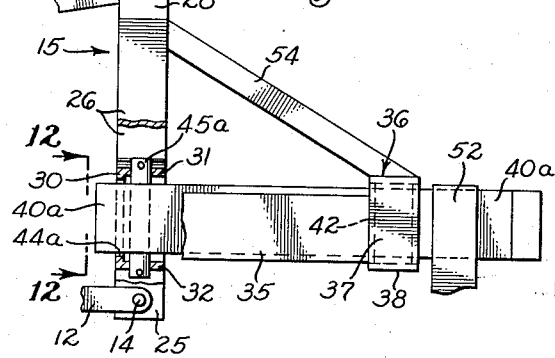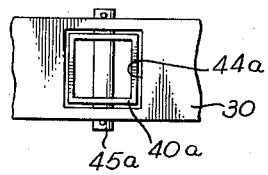

2,900,032
AUTOMATIC SELF-ALIGNING TWO-WAY PLOW

William Fisk Mellen, Anaheim, Calif., assignor to Alice Marian Mellen, Anaheim, Calif.

Application July 30, 1956, Serial No. 600,870

10 Claims. (Cl. 172—210)

This invention relates to plows, more particularly to two-way plows although it is applicable also to one-way plows.

The principal object of this invention is to provide a two-way plow which is self-aligning, that is automatically self-adjusting, with respect to the median line of draft of a tractor pulling the plow, whereby to correct for so-called "side-draft" caused by earth pressure on the mold board of the plow or on the land side opposite the mold board, and whereby automatically to maintain the required direction of the point of the plowshare so as to lead properly into the soil along the necessary line of draft and thereby avoid the common overcutting by the plow and the wobbling or skewing of the tractor from side to side which characteristically results from effects of fixed adjustments heretofore deemed necessary to straight plowing with tractors.

I have discovered that, surprisingly, if no attempts and provisions are made to produce fixed adjustments, heretofore thought necessary for different types of land and plowing conditions, and a free mounting of a plow-carrying shaft on the typical upstanding so-called A-frame of conventional tractors is used, such lateral adjustments or shifts of the plow as are necessary to correct for soil pressures or for lateral tractor wobble occur automatically. In other words, the plow is self-aligned or automatically aligned.

Thus, tractor draft and traction of the wheels are uniform on both sides. This is quite distinct from unequal traction with conventional plowing arrangements which cause loss of traction on one side due to adjustments which are improper for subsequent changes in soil conditions or other plowing conditions.

A further object of the invention is to simplify in some respects two-way plow constructions, and at the same time provide for automatic plow adjustment to cause an operating plow to follow continuously in a proper line of draft without skewing or wobbling of the tractor pulling the plow and with uniform traction of the tractor wheels.

In prior two-way plow devices, wherein a horizontal plow shaft or plow beam has its axis fixed with respect to the A-frame, change or shift in lateral soil pressures on the plow (regardless of the plowing condition causing the change) correspondingly shifts the load from one side of the tractor to the other. This results in unbalancing the A-frame pull on the tractor and causes the usual objectionable side-draft transmitted through the tractor's pulling arms by the uneven pull of the plow on the A-frame as plowing conditions change. These conditions probably can best be understood from a fairly full explanation of operation of conventional tractor plowing arrangements. The typical tractor used for pulling plows and the like carries a vertical so-called A-frame commonly positioned by a three-point suspension and control which includes two horizontal lifting and pulling arms supported at their forward ends on the rear of the tractor frame and supporting at their rearward ends the mentioned vertical A-frame. The top of the A-frame has often a thrust-link connection operating an automatic hydraulic control on the tractor. Such structure is also used with the construction of this improvement. The horizontal lifting arms are actuated by vertical pull links attached to rear portions of the lifting arms so as to elevate the A-frame by a hydraulic power-lift carried by the tractor and to which said thrust control connects. The plow is attached to and is drawn by the tractor through the lower portion of the A-frame. The plow bottoms are mounted by fixed adjustments to cause them to trail in fixed relation directly behind the middle of the A-frame which in turn is pulled directly behind the tractor, except for a limited amount of lateral swing occurring at the pulling arm attachment points. Effective soil pressures vary greatly especially by reason of said fixed adjustments, and, as such soil pressures fluctuate between most pressure on the mold board and most pressure on the land side of the plow bottoms, side drafts result which not only cause the tractor to wobble and produce unequal traction, but also result in corresponding over-cutting on the land side of the furrow being plowed and result in consequent further objectionable effects involving tractor action and wobble. Any adjustment of the direction of the point of the share to correct for such a given condition becomes ineffective as soon as the soil or other plowing condition again changes, and such changes are relatively frequent. These conditions cause heavy drafts on the tractor, so that the operator has a difficult time trying to steer the tractor and a poor job of plowing results. This is true despite the fact that the tractor wheels on one side travel in and follow the previously plowed furrow and are to a considerable extent guided thereby.

Thus, with conventional structures, tractor wobble is a large and serious problem and failure of the plow point to lead properly aggravates the problem and is aggravated by the tractor wobble. As a result, many farmers refuse to use two-way plows.

It is therefore an additional object of the invention to provide a tractor mounting for two-way plows and the like which is self-aligning and thereby provides automatically for whatever lateral adjusting may be necessary in a drawn plow or the like, whereby self-alignment is continuously effected and continuously compensates for side drafts resulting from varying soil pressures on the land side and on the mold board, and for other varying plowing conditions, whereby to assure the following of a proper median draft line behind the tractor.

It is also an object of the invention to present a mounting structure for two-way plows and the like to be connected with a tractor and providing a forward pivot for a plow shaft or beam carrying the plowing means, a portion of the shaft or beam behind such pivot having free guided lateral movement on both sides of a median draft line to permit such small automatic lateral adjustments as are necessary for close adherence to a median draft line of the tractor or a draft line leading to or near the tractor center. In practice, such means will preferably be carried by the usual A-frame and will preferably prevent vertical movement of the shaft or beam with respect to the A-frame, whereby to provide for the usual automatic thrust control to the usual hydraulic power lift of the tractor employed to compensate for excessive plowing resistances by partially lifting the plow from the soil.

Other objects of the invention, and various features of construction, will become apparent to those skilled in this art upon reference to the following specification and accompanying drawings illustrating certain embodiments.

In the drawings:

Fig. 1 is a side elevation of a two-way plow structure in accordance with this invention carried at the rear of a conventional tractor, the operative plow being shown in lowered position approximately as when plowing;

Fig. 2 is a transverse section looking rearward as indicated by the line 2—2 of Fig. 1;

Fig. 3 is a transverse vertical section looking forward as indicated by the line 3—3 of Fig. 1;

Fig. 4 is a vertical cross-sectional detail taken on the line 4—4 of Fig. 1;

Fig. 5 is a fragmentary plan view taken from the line 5—5 of Fig. 1 to show mechanism controlling rotation of the plow shaft;

Fig. 6 is a fragmentary horizontal section approximately as indicated by the line 6—6 of Fig. 1;

Fig. 7 is a fragmentary transverse vertical section taken from the line 7—7 of Fig. 6;

Fig. 8 is a vertical section similar to the side elevation of Fig. 1 and showing a modified form of connection of the forward end of the plow shaft;

Fig. 9 is a transverse detail indicated by the line 9—9 of Fig. 8;

Fig. 10 is a vertical section indicated by the line 10—10 of Fig. 8;

Fig. 11 is a vertical section similar to that of Fig. 8 and showing a modified form of mounting for a plow shaft using a one-way plowing means; and Fig. 12 is an elevational detail taken from the line 12—12 of Fig. 11.

The drawings illustrate the rearward portion 10 of a conventional tractor housing to which the forward ends of the usual lifting and pulling arms 12 are pivotally attached as indicated at 13, the rearward ends of such arms 12 being engaged with transversely extending horizontal pivot means shown in the form of studs 14 located at the lower ends of the sides of an A-frame 15 similar to conventional A-frames. As seen in Fig. 1, conventional elevating arms 16 are employed, the forward ends of these arms being connected with a common hydraulically operated crank member 17 on the tractor, the rearward ends of the lifting arms 16 being connected to the upper extremities of elevating links 18 whose lower extremities are pivotally connected to intermediate portions of the supporting, lifting and pulling arms 12 for the A-frame 15. A positioning link 20 is pivotally connected at 21 to the top of the A-frame 15, this link 20 extending forward and being pivotally connected in a conventional manner to a rocking link 22 which is in turn pivotally connected to an upper rearward portion of the tractor housing or frame 10, a thrust rod 23 extending forward from the element 22 to an automatic hydraulic control of a hydraulic power-lift system typically carried by the tractor. By these means the A-frame 15 is conventionally raised and lowered by a tractor operator, the horizontal pulling arms 12 positioning and supporting the A-frame 15 from its lower end, and the connecting link 20 positioning the upper end of the A-frame 15.

In the form illustrated, the A-frame 15 comprises two vertically disposed angularly-bent side bars having vertical portions 25 and integral inclined upwardly extending bracing portions 26 whose upper ends are welded to and brace the upwardly projecting ends of two narrowly spaced standards 28 between whose upper extremities the pivot means 21 of the connecting link 20 are disposed. Between the lower edges of the vertical portions 25 of the side bars of the A-frame 15 there is welded or otherwise rigidly secured a transverse lower draft bar and bearing plate 30 indicated in Figs. 1, 2, 3 and 6. This transverse plate 30 has rigidly connected thereto along its upper edge a rearwardly directed flange member 31 and there is similarly provided at the lower edge of the transverse plate 30 a lower rearwardly directed flange member 32. The ends of these flange members 31 and 32 are welded to the inner walls of the mentioned vertical members 25 of the A-frame 15. This assemblage of the transverse plate 30 and its flanges 31 and 32 may be a section of channel iron of appropriate dimensions. The lower ends of the vertically extending standards 28 are welded to the upper face of the upper flange 31, thus forming a rigid upstanding A-frame 15.

In addition to the described parts of the A-frame 15, there are also included two rearwardly extending converging horizontal frame members 35 welded at their forward ends to the rearward edges of the vertical bar members 25. The rearward, converging ends of the lateral horizontal frame members 35 are welded to an upstanding rectangular box 36 of appreciable width to provide a bearing means and guide means for free horizontal movement of a tubular plow shaft as presently to be described. As probably best seen in Fig. 3, this bearing box 36, which is a rigid device, comprises vertical end members 37, to which the rearward ends of the frame members 35 are welded as above indicated, and relatively elongated horizontal members 38. These members 37 and 38 are rigidly connected, as by welding or other integral construction, and are formed of heavy metal strap material having appreciable width, as well illustrated in Fig. 1, so as to provide adequate bearing surfaces for a respective horizontally swinging portion of the mentioned plow shaft. This plow shaft, which conveniently is tubular, is indicated at 40 and is desirably provided with a bearing collar 42 to bear upon the upper and lower members 38 of the box 36 for free movement between the vertical end members 37 by lateral swinging movement or by rolling movement as the case may be at different stages of operation.

The forward end portion of the tubular plow shaft 40 is conveniently borne in the forward transverse plate 30 at the lower end of the A-frame 15. While much more complicated and expensive bearing means may be employed, as will be obvious to those skilled in the art, the simple constructions shown have been employed. As seen in Figs. 1 to 6, the middle of the plate 30 is provided with a central circular opening 44 of slightly greater diameter than the outside diameter of the plow shaft 40. To transmit the draft of the plow shaft 40 to the plate 30, which is braced by the upper and lower flanges 31 and 32 as previously described, a normally vertical bearing and draft pin 45 is extended through the shaft 40, such pin 45 being retained in position by any appropriate means such as small pins or cotter keys 46. The pin 45 thus constitutes a relatively heavy pivot pin whose extremities provide the required bearing means against the plate 30 and also provide for limited pivoting movement of the shaft 40 during operation, or for rotary movement of the shaft 40 when the plows have their positions changed at the end of a furrow as subsequently to be described. The rearward end of the plow shaft 40 is provided with conventional, oppositely pitched plow bottoms 48 having the usual mold boards 49 and land sides 50 with the typical plowshare or point 51, these plow bottoms 48 being secured in as many pairs as desired to the rear end of the plow shaft 40 by heavy rigid mounting arms 52 as well understood in the art. Since the plow bottoms 48 in operation characteristically exert a considerable amount of plowing resistance which tends to elevate them, the rearward portion of the frame carrying the bearing box 36 is braced against the top of the A-frame 15, as by means of an upwardly and forwardly extending inclined brace bar 54 whose lower rearward end is welded to the top of the bearing box 36 and whose upward forward end is fixedly secured to a rigidly connected block 55 fixed between the standards 28. Thus the A-frame 15 as described, the horizontal frame members 35, the bearing box 36 and the brace arm 54 constitute a fairly rigid plow-carrying structure.

In Figs. 8 and 9 there is illustrated a modified form of pivot for the forward portion of the plow shaft 40.

This is in the form of a collar 58, in which the shaft 40 rotates when the plow bottoms are being reversed, the collar 58 having diametrically disposed radially projecting pivot studs 59 which are received in corresponding positioning ears 60 that are rigidly secured, as by welding, to the forward edge of the transverse plate 30 at the junctures with the flanges 31 and 32. To provide for rotation of the plow shaft 40 and at the same time provide suitable bearing means for draft thereof, another collar 62 is fixed on the shaft 40 through the medium of a through-pin 63, the rearward face of the collar 62 thus bearing against the forward face of the collar 58 to provide an appropriate traction bearing during operation and permit rotation when the plow bottoms are being changed.

In Fig. 10 there is more or less diagrammatically shown at 64 a ball or roller bearing between the tubular shaft 40 and the horizontal members 38 of the bearing box 36, which ball or roller bearing may be substituted for the simple collar 42 shown in the form of Figs. 1 to 6.

It is also possible to employ the present improvement, embodying a pivot in a forward portion of a plow shaft and bearing means for free lateral swinging thereof in the box 36, for one-way plows. This is illustrated in Figs. 11 and 12 where the plow shaft 40a is illustrated as being square in cross section and is provided with a vertical pivot pin 45a extending through the shaft with its ends secured in the upper and lower flanges 31 and 32 of the transverse plate 30. In this form the opening 44a receiving the shaft 40a is square to accommodate the shaft and slightly oversize, as in the case of the opening 44, to permit the limited amount of movement required. Here, the square shaft 40a slides back and forth on the bottom member 38 of the bearing box 36.

For two-way plows, such as illustrated in Figs. 1 to 10, means are required to rotate the tubular plow shaft 40 through 180° so as to reverse the plows when turning around at the ends of furrows, whereby to throw the earth of a furrow in the same direction as before when the plow is, however, traveling in the opposite direction. It is also desirable to employ latching means to retain the plows in their reversed positions. As a preferred structure to rotate the tubular or cylindrical shaft 40, the means shown embodies a cable 70 which is fixed directly or indirectly to the rotary shaft 40 by means of a clamp 72 seen especially in Figs. 1 and 4. In this particular form, the clamp 72 is fixed to an axially slidable collar 74, this collar being slidably mounted by a short bolt 75 in the extremity of the plow shaft 40, the outer portion of the bolt being received in a horizontal slot 75a in the collar 74. This slidable arrangement of the collar 74 provides for desirable axial shift of the collar during various movements of the cable 70 when operating to rotate the shaft 40. When one of the plow bottoms 48 is in its lowered operative position, the clamp 72 lies on one side of the cylindrical shaft 40 on a horizontal diameter, and when the other plow bottom is brought into operative position, the clamp 72 moves over top dead center to the diametrically opposite horizontal position. Since latching means, as presently to be described, is used to retain the plows in their operative plowing positions, means is needed for releasing the latches. Such means includes an elongated horizontally extending lever 76 whose rearward end is fulcrumed at 77 to the bottom of the bearing box 36. The forward end of this arm is in the form of an open loop 78 which receives the two ends of the cable 70. The cable 70 causes rotation of the plow shaft 40 through a control mechanism on the lower rear portion of the tractor housing and through the lifting of the A-frame 15 by the pulling and lifting arms 12 and hydraulically actuated elevating means 16, 17 and 18 previously described. The control means disclosed is similar to those of my earlier Patent 2,672,800, issued March 23, 1954. As here illustrated, this means includes two energizing and positioning arms 80 to whose rearward ends the respective ends of the shifting cable 70 are attached as by means of clips 81. The forward ends of the arms 80 are pivoted at 82 to spaced upstanding walls 83 of a bracket structure 84 carried by a tractor housing. To effect energization selectively of the respective arms 80, a throw bolt 85 has its ends slidably mounted in holes in the rearward portions of the walls 83. The throw bolt is movable from side to side by an upstanding shift lever 86 positioned by a bracket 86a also on the rear of the tractor housing and rising into position to be reached by the tractor operator. The throw bolt 85 is of such length that when one end thereof overlies one of the arms 80, its other end clears the other arm 80. Thus, such other arm 80 will move freely without any restraint when the A-frame 15 is lifted, whereas the one arm 80 will be stopped by the projecting respective end of the throw bolt 85 so that such one arm 80 cannot rise above the position determined by such projecting end. Thus, if the A-frame 15 is lifted, tension is placed upon that end of the cable 70 attached to such one arm 80, whereupon such end of the cable 70 pulls upon the clamp 72 and rotates the plow shaft 40 to reverse the plows. There is sufficient slack in the one end of the cable 70 to permit the operating plow to be lifted from the soil before rotation of the plow shaft 40 commences. In order that shift of the throw bolt 85 in either direction may be limited to just the extent required, stop washers 87 may be fixed on the bolt ends to strike the respective inner face of the corresponding wall 83 and avoid withdrawal of the other end of the bolt from its hole in the respective wall.

When the A-frame 15 is lifted by the hydraulic mechanism on the tractor, as previously explained, and tensions one end of the cable 70 to rotate the plow shaft 40, the tensioning of such one end of the cable by that energizing arm 80 which is restrained by the projecting end of the throw bolt 85 first operates to swing the rigid loop 78 and the latch-releasing lever 76 to the left as viewed in Figs. 1, 4 and 7 and toward the top of the view as seen in Fig. 6. Such movement causes the middle portion of the latch-operating lever 76 to pull upon a short cable 90 (Figs. 6 and 7) which is fixed to the lever 76 and extends to a latch arm or trigger 92, one of whose ends is fulcrumed at 93 to a bracket 94 fixed to the adjacent frame member 35. The function of the trigger 92 is to release a latch head 95 at the under side of the end of a latch-carrying arm 96 mounted on a collar 97 fixed on the plow shaft 40. Pull on the short cable 90 draws the trigger 92 away from the latch head 95, against the tension of a spring 92a, so that continued elevation of the A-frame 15 causes continued draft upon the shaft rotating cable 70 to rotate the plow shaft 40 through 180° from the position shown in Fig. 4. At this stage the plow bottoms 48 will have been reversed and the latch arm 96 will have been rotated 180° from the positions of Figs. 6 and 7. The tractor may now be turned around, and, if desired, the A-frame 15 lowered to bring the shifted plow bottom 48 down to the soil so that plowing in the reverse direction may be accomplished, the soil being turned in the same direction as that of the previous furrow. When the latch arm 96 has been rotated from the positions of Figs. 6 and 7 through 180° to lie at the opposite side of the horizontal framework, another latch head 95 at the opposite side of the outer end of the latch arm 96 is brought into contact with another latch-releasing arm or trigger 92 pivoted on another bracket 94 and tensioned by another spring 92a and operable when required by another short cable 90 also connected with the latch-operating lever 76. The two latch heads 95 are so beveled or otherwise shaped that when each is rotated down against its respective trigger 92 the latter is forced against the tension of its spring 92a to shift its trigger until the latch head has passed and is then caught and held by such trigger. In such a held position, the swinging latch arm 96 is held against further downward movement by striking a limiting bar 98 fixed to the adjacent bracket 94, and frame flange 32. As seen in Fig. 7, the latch heads 95 are conveniently carried at the opposite ends of an appropriate boss 99 fixed on the end of the swinging latch arm 96 and may be adjustably threaded into such boss. As seen in Fig. 2, the forward end of the latch-releasing lever 76 is supported and guided by a rod 100 secured at the under side of the transverse plate 30. Similarly, the forward end of each of the triggers 92 is guided and positioned between the bottom flange 32 on the plate 30 and an overlying transverse retainer 102 (Fig. 6) such as an elongated upstanding U-bracket.

When the plow shaft 40 of the form of Figs. 1 to 6 is being rotated at the end of a furrow to change the plows, the rearward portion of the shaft 40 mounted in the bearing box 36 will roll on the bottom member 38 of the bearing box toward one end of the latter. This rolling movement is desirable because it moves the rearward end of the plow shaft 40 from what previously was the low end of the bearing box 36 (due to the tractor wheels on the plowing side being in the furrow) toward the opposite end to position the shaft correctly for the return plowing excursion back across the field. This desirable feature is, of course, not accomplished where the roller or ball bearing type of mounting of Fig. 10 is used.

From the foregoing, it will be apparent that, as soil pressures vary on the opposite sides of the plow bottom, the plow shaft 40 is free to swing on its vertical pivot, thereby eliminating side draft on the tractor which would result if the shaft 40 were not free to move. Thus, straight plowing, without tractor or plow wobble due to changing soil or other plowing conditions, is accomplished, and wheel traction is always balanced and uniform. Also, when plowing across the face of a hillside, the free mounting of the plow shaft 40 prevents the pull of gravity from skewing or causing lateral wobble of the plow bottom or tractor. Here, resultant pressure is exerted on the land side of the plow bottom and straight plowing results. In all situations there is no excessive cutting or so-called over-cutting. Correction required at any instant for width of cut or side draft is made immediately and automatically, and the plow is thus continuously self-aligning. This occurs with very little lateral movement of the shaft, and such movement has never been more than a very few inches from either side of the median draft line.

The invention claimed is:

1. In combination in a two-way plow structure for tractors: a frame having means thereon for mounting the frame on supporting and draft means carried by a tractor; a horizontally disposed rearwardly extending rotary plow shaft having at its rearward end oppositely disposed, oppositely pitched plow bottoms of a two-way plow; means in a lower forward portion of said frame and adjacent the forward end of said shaft rotatably mounting said shaft in said frame; vertical pivot means adjacent the forward end of said shaft and mounting said forward end of said shaft in a lower portion of said frame to swing in a horizontal plane about said vertical pivot means; and transversely extending rearward guide means on a rearward lower portion of said frame behind said pivot means and said means rotatably mounting said shaft, such guide means freely receiving a rearward portion of said plow shaft for free movement thereof laterally in a horizontal plane during forward draft by the tractor of the frame, the plow shaft thereon and said plow bottoms while plowing, said rearward guide means including means for supporting and positioning the rearward end of said shaft and also including means preventing movement of said plow shaft vertically independently of said guide means.

2. A combination as in claim 1, wherein said frame is an upstanding frame having a transverse lower draft bar to the middle of which said forward end of said shaft is connected by said pivot means, said rearward portion of said frame extending horizontally rearward from said lower draft bar and supporting said guide means, said frame including brace means leading forward and upward from said guide means and connecting with the top portion of said upstanding frame.

3. A combination as in claim 1 wherein said frame includes an upstanding frame member having a transverse lower draft bar to the middle of which said forward end of said shaft is connected by said pivot means, said rearward portion of said frame extending horizontally rearward from said lower draft bar.

4. In combination in means for mounting a two-way plow on a tractor: a frame having a forward lower portion providing median forward bearing means and having a rearward portion in substantially the same horizontal plane as receives said bearing means; transversely elongated rearward bearing means in said rearward frame portion and extending laterally to opposite sides of a median horizontal draft line through said forward lower portion of said frame and both of said bearing means; means at the sides of said frame for connection with supporting, lifting and draft means of a tractor; an elongated plow shaft normally disposed along said horizontal draft line; opposed two-way plow bottoms mounted on the rearward portion of said shaft; mounting means on the forward end portion of said shaft and providing pivot means for free swinging of said shaft laterally about a vertical axis in said forward bearing means for lateral swinging of rearward portions of said shaft in said transverse rearward bearing means, said shaft being rotatable in both of said bearing means; and means connected with said shaft for rotating said shaft in both of said bearing means for reversing two-way plows on the rearward portion of said shaft.

5. A combination as in claim 4 wherein said frame includes a braced upstanding section having a thrust link connection at its upper portion for automatic actuation of a hydraulic lift control on the tractor, said rearward bearing means holding said shaft against vertical movement with respect to said frame while providing for said lateral swinging movement of said shaft.

6. A combination as in claim 4 including latch means for holding said shaft against rotation from an operative position.

7. A combination as in claim 6 including means connected with said latch means and mountable on the tractor for releasing said latch means and rotating said shaft upon elevation of said frame.

8. In combination in plow-mounting means for tractors: a rigid frame having laterally positioned means for mounting the frame on draft and carrying means therefor of a tractor, said frame including a rigid horizontal portion having forward and rearward mounting portions; a plow shaft horizontally disposed in said frame and having forward and rearward portions mounted on said forward and rearward mounting portions of said frame, the rear end of said shaft having plow-carrying means; means on said forward mounting portion of said frame rotatably mounting the forward end of said shaft to rotate about its longitudinal axis; pivot means carried by said forward mounting portion and pivotally mounting said shaft on said horizontal frame portion; transverse guide means carried by the other of said mounting portions and freely receiving and mounting said shaft therein for free lateral swinging movement of said shaft in such guide means; opposed two-way plows mounted on the rear end of said shaft to rotate with said shaft; and means connected with said shaft to rotate the latter and interchange said two-way plows.

9. A combination as in claim 8 wherein said rigid frame includes an upstanding frame member having a transverse lower draft bar, the middle of which mounts said pivot means.

10. A reversible two-way plow structure including: a mounting frame adapted to be supported for movement with respect to the ground; a longitudinal plow shaft carried by said frame; journal means on a forward portion of said frame rotatably securing the shaft on the frame with the shaft projecting rearwardly of the frame, said journal means supporting the shaft for lateral swinging movement to right or left relative to the longitudinal center draft line of the implement; opposed oppositely pitched plow structures secured to and projecting radially from the shaft rearwardly of the frame; means to rotate the shaft for selectively disposing either plow structure in depending ground-working position with the other plow structure projecting upwardly in inoperative position; bearing means at the rear of said frame and receiving a rearward portion of said shaft, said bearing means serving as guide means providing for free lateral movement of said rearward portion of said shaft and preventing vertical movement of said shaft with respect to said frame; and bracing means connecting an upper portion of said frame with said bearing and guide means.

References Cited in the file of this patent

UNITED STATES PATENTS

| | | |
|---|---|---|
| 2,453,197 | Clay | Nov. 9, 1948 |
| 2,462,726 | Currie | Feb. 22, 1949 |
| 2,714,345 | Wilkerson et al. | Aug. 2, 1955 |

FOREIGN PATENTS

| | | |
|---|---|---|
| 374,901 | France | Apr. 29, 1907 |
| 837,329 | Germany | Apr. 21, 1952 |
| 5,305 | Switzerland | May 3, 1892 |